US010093783B2

(12) United States Patent
Tokumura

(10) Patent No.: US 10,093,783 B2
(45) Date of Patent: Oct. 9, 2018

(54) HEAT-EXPANDABLE MICROSPHERES AND APPLICATION THEREOF

(71) Applicant: MATSUMOTO YUSHI-SEIYAKU CO., LTD., Yao-shi, Osaka (JP)

(72) Inventor: Sachiko Tokumura, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 0 days.

(21) Appl. No.: 15/529,681

(22) PCT Filed: Nov. 12, 2015

(86) PCT No.: PCT/JP2015/081828
§ 371 (c)(1),
(2) Date: May 25, 2017

(87) PCT Pub. No.: WO2016/084612
PCT Pub. Date: Jun. 2, 2016

(65) Prior Publication Data
US 2017/0335082 A1 Nov. 23, 2017

(30) Foreign Application Priority Data
Nov. 26, 2014 (JP) .................................. 2014-238656

(51) Int. Cl.
| *C08J 9/16* | (2006.01) |
| *C08J 9/20* | (2006.01) |
| *B01J 13/14* | (2006.01) |
| *C09D 7/12* | (2006.01) |
| *C09D 11/00* | (2014.01) |
| *C04B 16/08* | (2006.01) |
| *C04B 18/02* | (2006.01) |
| *C04B 38/00* | (2006.01) |
| *C09D 7/65* | (2018.01) |
| *C04B 111/40* | (2006.01) |

(52) U.S. Cl.
CPC .................. *C08J 9/20* (2013.01); *B01J 13/14* (2013.01); *C04B 16/085* (2013.01); *C04B 18/027* (2013.01); *C04B 38/009* (2013.01); *C09D 7/125* (2013.01); *C09D 7/65* (2018.01); *C09D 11/00* (2013.01); *C04B 2111/40* (2013.01); *C08J 2203/14* (2013.01); *C08J 2203/182* (2013.01); *C08J 2333/02* (2013.01)

(58) Field of Classification Search
CPC ............. C08J 9/16; C08J 9/20; C08J 2309/02
See application file for complete search history.

(56) References Cited

U.S. PATENT DOCUMENTS

| 9,663,626 B2 * | 5/2017 | Tayagaki ................... C08F 2/20 |
| 2003/0114546 A1 | 6/2003 | Satake et al. |
| 2005/0026067 A1 | 2/2005 | Masuda et al. |
| 2009/0176098 A1 * | 7/2009 | Masuda ................... B01J 13/14 428/407 |
| 2009/0292031 A1 | 11/2009 | Ejiri |
| 2012/0080131 A1 | 4/2012 | Teratani et al. |
| 2014/0364521 A1 | 12/2014 | Tayagaki et al. |

FOREIGN PATENT DOCUMENTS

| CN | 101351265 A | 1/2009 |
| CN | 101378830 A | 3/2009 |
| CN | 101378831 A | 3/2009 |
| GB | 2 025 429 A | 1/1980 |
| JP | 54-163966 A | 12/1979 |
| JP | 62-286534 A | 12/1987 |
| JP | 2002-012693 A | 1/2002 |
| JP | 2005-067943 A | 3/2005 |
| JP | 2010-222407 A | 10/2010 |
| JP | 2011-074339 A | 4/2011 |
| JP | 2012-056992 A | 3/2012 |
| JP | 2013-075278 A | 4/2013 |
| JP | 2013-76032 A | 4/2013 |
| WO | 03/099955 A1 | 12/2003 |
| WO | 2007/046273 A1 | 4/2007 |
| WO | 2007/072769 A1 | 6/2007 |
| WO | 2007/091960 A1 | 8/2007 |
| WO | 2007/091961 A1 | 8/2007 |
| WO | 2013/111688 A1 | 8/2013 |

OTHER PUBLICATIONS

International Search Report of PCT/JP2015/081828 dated Feb. 2, 2016 [PCT/ISA/210] English Translation.
Communication dated Apr. 3, 2018 from the State Intellectual Property Office of the P.R.C. In counterpart application No. 201580064226.0.

* cited by examiner

*Primary Examiner* — Kara B Boyle
(74) *Attorney, Agent, or Firm* — Sughrue Mion, PLLC

(57) ABSTRACT

Heat-expandable microspheres including a thermoplastic resin shell and a thermally-vaporizable blowing agent encapsulated therein. The thermoplastic resin is produced by polymerizing a polymerizable component containing (A) a nitrile monomer including acrylonitrile and methacrylonitrile, (B) a carboxyl-group-containing monomer, and (C) a monomer copolymerizable with the nitrile monomer (A) and the carboxyl-group-containing monomer (B). Further, the amount of the acrylonitrile in the nitrile monomer (A) ranges from 0.1 to 9 wt % based on the nitrile monomer (A). Also disclosed are hollow particles manufactured by heating and expanding the heat-expandable microspheres; a composition containing a base compound and at least one particulate material selected from the heat-expandable microspheres and the hollow particles; and a formed product manufactured by molding or applying a coat of the composition.

14 Claims, 2 Drawing Sheets

[Fig. 1]
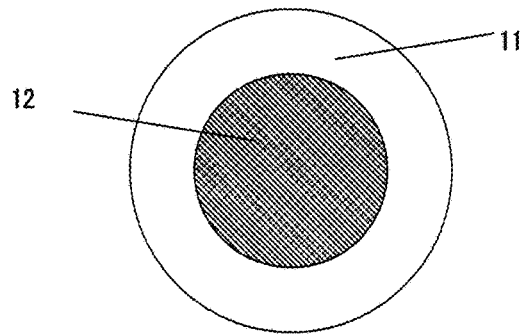
[Fig. 2]
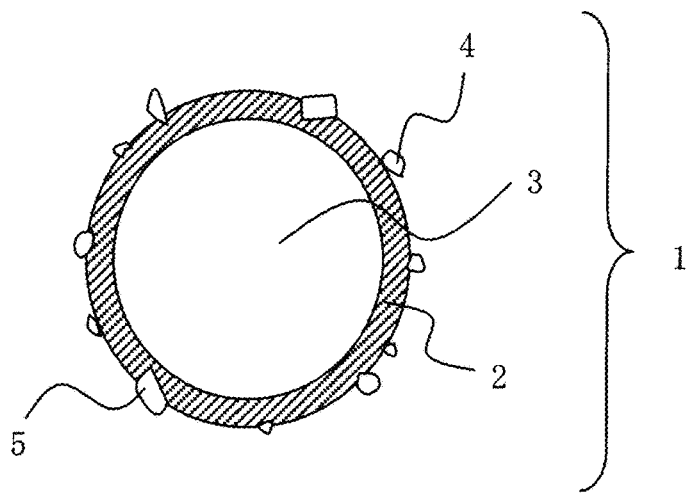
[Fig. 3]
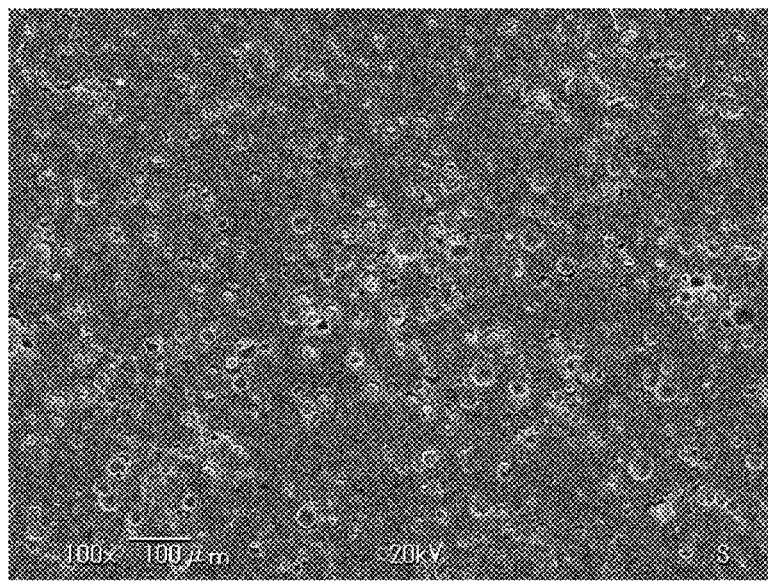

[Fig. 4]
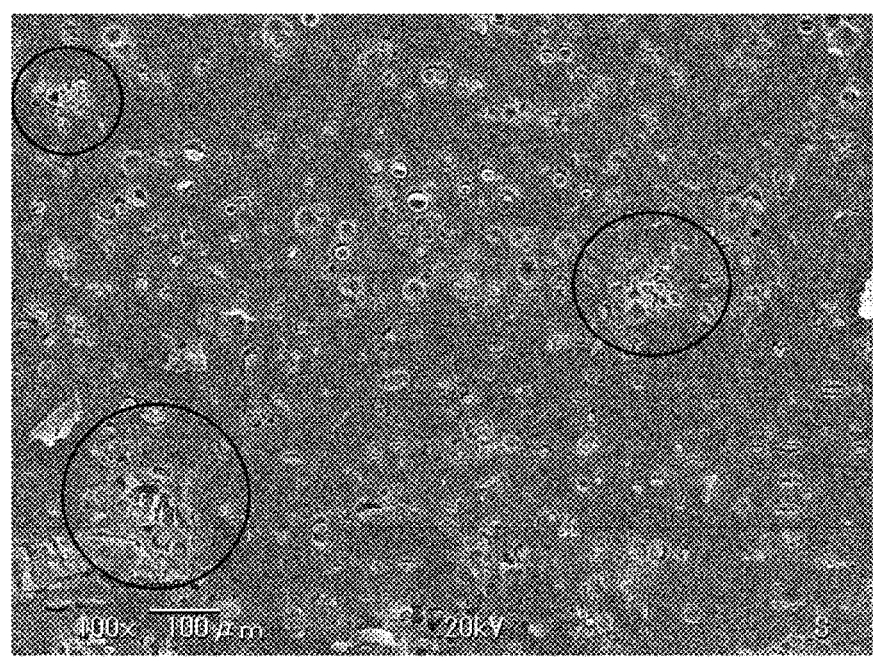

HEAT-EXPANDABLE MICROSPHERES AND APPLICATION THEREOF

CROSS-REFERENCE TO RELATED APPLICATIONS

This application is a National Stage of International Application No. PCT/JP2015/081828 filed Nov. 12, 2015, which claims priority from Japanese Patent Application No. 2014-238656 filed Nov. 26, 2014, the contents of all of which are incorporated herein by reference in their entirety.

BACKGROUND OF THE INVENTION

1. Field of the Invention

The present invention relates to heat-expandable microspheres and application thereof. Specifically, the present invention relates to heat-expandable microspheres, hollow particles manufactured by heating and expanding the heat-expandable microspheres, a composition containing a base component and at least one particulate material selected from the heat-expandable microspheres and hollow particles, and a formed product manufactured by forming the composition.

2. Description of the Related Art

Heat-expandable microspheres are fine particles, each of which comprises a thermoplastic shell and a blowing agent encapsulated therein. Their heat-expandable property allows them to be used in wide application ranges including materials for imparting design, such as foamable inks and wallpapers, and lightweight fillers for resins and paints.

An example of heat-expandable microspheres is the expandable thermoplastic beads (heat-expandable microspheres) disclosed in PTL 1, manufactured by polymerizing an unsaturated ethylene monomer or a mixture thereof in an aqueous dispersion in the presence of a blowing agent (expansion agent). A copolymer of vinylidene chloride and acrylonitrile having a good gas barrier effect was proposed for the thermoplastic resin constituting the shell of the beads.

Although the heat-expandable microcapsules manufactured by this method could be expanded at a comparatively low temperature, about 100° C., the expanded microcapsules were found to shrink at higher temperatures. Thus, the heat-expandable microcapsules could only be used within a limited temperature range.

PTL 2 discloses heat-expandable microcapsules (heat-expandable microspheres) having a high heat and solvent resistance, manufactured by microencapsulating a volatile blowing agent in a shell of a polymer composed of 80 wt % or more of a nitrile monomer, 20 wt % or less of a non-nitrile monomer and 0.1 to 1 wt % of a cross-linking agent.

PTL 3 discloses heat-expandable microcapsules (heat-expandable microspheres) which are constantly expandable to a high expansion ratio in a high temperature region, and which comprise a shell of a polymer polymerized from (I) a nitrile monomer, (II) a monomer having an unsaturated double bond and carboxyl group per molecule, (III) a monomer having at least two polymerizable double bonds per molecule and optionally (IV) a monomer different from the monomers (I), (II) and (III) and copolymerizable therewith, and a blowing agent encapsulated in the shell.

The heat-expandable microspheres described in PTL 2 and 3 could be employed in wider application ranges as lightweight fillers for pastes and resins.

PTL 4 discloses the heat-expandable microspheres having high heat resistance and constantly expandable to a high expansion ratio, and which are manufactured by encapsulating a blowing agent in a shell of a copolymer having a polymethacrylimide structure. The literature also discloses that the shell of a copolymer having a polymethacrylimide structure is composed of methacrylonitrile and methacrylic acid.

PTL 5 discloses heat-expandable microcapsules (heat-expandable microspheres) having high heat resistance and which are expandable to a high expansion ratio, and which comprise a shell of a polymer polymerized from a monomer composition containing (I) 30 to 40 wt % of a polymerizable monomer composed of acrylonitrile and methacrylonitrile, (II) 30 to 50 wt % of a radically-polymerizable carboxyl-group-containing unsaturated $C_3$-$C_8$ carboxylic acid monomer, (III) 0.1 wt % or more of a polymerizable monomer having at least two double bonds per molecule, and (IV) a polymerizable monomer the homopolymer of which has a solubility parameter not greater than 10. The polymerizable monomer (I) contains 10 to 60 wt % of acrylonitrile and the monomer composition further contains 0.1 to 10 parts by weight of a cationic metal salt ionically-bondable to the radically-polymerizable carboxyl-group-containing unsaturated $C_3$-$C_8$ carboxylic acid monomer (II) to 100 parts by weight of all of the monomers.

CITATION LIST

Patent Literature

[PTL 1] Japanese Patent Application Publication No. 1979-163966
[PTL 2] Japanese Patent Application Publication No. 1987-286534
[PTL 3] WO 2003/099955
[PTL 4] WO 2007/072769
[PTL 5] Japanese Patent Application Publication No. 2010-222407

Problems to be Solved by the Invention

Heat-expandable microspheres usually have a particle size ranging from 1 to 100 μm (fine particles), and the mass of heat-expandable microspheres may cause problems relating to the flowability of powder materials being conveyed (hereinafter simply referred to as "flowability"), such as adhesion of microspheres on the inside of containers and tanks, a bridge in a hopper (an arch formed by particles of a powder material at the outlet of a hopper which blocks the outlet to prevent the powder material from being discharged), and blocking of conveyor pipe. Heat-expandable microspheres (fine particles) having high flowability are desirable for good workability in a process for preparing a composition containing the heat-expandable microspheres and easy dispersion of the heat-expandable microspheres in a resin composition.

The heat-expandable microspheres disclosed in PTL 1 have poor heat resistance and flowability. The heat-expandable microspheres with high heat resistance disclosed in PTLs 2 to 5 also have poor flowability as well as in PTL 1. In addition, the heat-expandable microspheres disclosed in PTLs 1 to 5 do not disperse sufficiently in resin compositions.

SUMMARY OF THE INVENTION

It is therefore an object of the present invention to provide heat-expandable microspheres having high heat resistance and good flowability, and applications thereof.

Upon diligent study, the present inventors found that the fine particles of the heat-expandable microspheres comprising a thermoplastic resin shell produced by polymerizing a specific polymerizable component and a thermally-vaporizable blowing agent encapsulated therein have high heat resistance and good flowability, to thereby achieve the present invention.

More particularly, the above object has been achieved, in a first aspect of the invention, by providing (1) heat-expandable microspheres comprising a thermoplastic resin shell and a thermally-vaporizable blowing agent encapsulated therein, wherein the thermoplastic resin is produced by polymerizing a polymerizable component comprising (A) a nitrile monomer containing acrylonitrile and methacrylonitrile, (B) a carboxyl-group-containing monomer, and (C) a monomer copolymerizable with the nitrile monomer (A) and the carboxyl-group-containing monomer (B), and the amount of the acrylonitrile in the nitrile monomer (A) ranges from 0.1 to 9 wt % based on the nitrile monomer (A).

In a preferred embodiment (2) of the heat-expandable microspheres (1) above, the amounts of the nitrile monomer (A) and the carboxyl-group-containing monomer (B) in the polymerizable component satisfy the following expression (1).

Amount of the nitrile monomer (A)<Amount of the carboxyl-group-containing monomer (B).　　Expression (1)

In another preferred embodiment (3) of the heat-expandable microspheres (1) or (2) above, the polymerizable component contains 20 to 65 wt % of the nitrile monomer (A), 25 to 75 wt % of the carboxyl-group-containing monomer (B) and 0.3 to 45 wt % of the monomer (C).

In yet another preferable embodiment (4) of any of the heat-expandable microspheres (1) to (3) above, the monomer (C) comprises at least one monomer selected from the group consisting of (C1) (meth)acrylate monomer, (C2) (meth)acrylamide monomer, (C3) styrene monomer and (C4) a monomer having a functional group reactive with the carboxyl group of the carboxyl-group-containing monomer (B).

In yet another preferred embodiment (5) of any of the heat-expandable microspheres (1) to (4) above, the amount of the acrylonitrile in the nitrile monomer (A) ranges from 0.1 to 3.5 wt % based on the nitrile monomer (A).

In yet another preferred embodiment (6) of the heat-expandable microspheres (4) above, the monomer (C) comprises the monomer (C4) and at least one monomer selected from the group consisting of the (meth)acrylate monomer (C1), the (meth)acrylamide monomer (C2) and the styrene monomer (C3).

In yet another preferred embodiment (7) of the heat-expandable microspheres of any of (1) to (6) above, the maximum expansion temperature of the heat-expandable microspheres is not lower than 190° C.

In a second aspect, the present invention provides (8) hollow particles manufactured by heating and expanding the heat-expandable microspheres of any of (1) to (7) above.

In a third aspect, the present invention provides (9) a composition containing a base component and at least one particulate material selected from the group consisting of the heat-expandable microspheres of any of (1) to (7) above and the hollow particles (8) above.

In a fourth aspect, the present invention provides (10) a formed product manufactured by molding or applying a coat of the composition (9) above.

Advantageous Effects of Invention

The heat-expandable microspheres of the present invention have high heat resistance and good flowability, and also exhibit high dispersibility in the base component.

The hollow particles of the present invention manufactured from the heat-expandable microspheres have high heat resistance and good flowability, and also exhibit high dispersibility in the base component.

The composition of the present invention containing the heat-expandable microspheres and/or the hollow particles has high heat resistance.

The formed product manufactured by molding or applying the composition is lightweight and has high heat resistance.

BRIEF DESCRIPTION OF THE DRAWINGS

FIG. 1 is a schematic diagram of an example of the heat-expandable microspheres.

FIG. 2 is a schematic diagram of an example of the hollow particles.

FIG. 3 is an electron micrograph showing the cross section of the formed product of Example 24.

FIG. 4 is an electron micrograph showing the cross section of the formed product of Comparative Example 11.

REFERENCE SIGNS LIST

Reference signs used to identify various features in the drawings include the following.
 11 Shell of thermoplastic resin
 12 Blowing agent
 1 Hollow particles (fine-particle-coated hollow particles)
 2 Shell
 3 Hollow
 4 Fine particle (in a state of adhesion)
 5 Fine particle (in a state of fixation in a dent)

DETAILED DESCRIPTION OF THE PREFERRED EMBODIMENTS

The present invention will next be described in greater detail with reference to the drawings. However, the present invention should not be construed as being limited thereto.
Heat-Expandable Microspheres As shown in FIG. 1, the heat-expandable microspheres of the present invention comprise a shell 11 of thermoplastic resin and a thermally-vaporizable blowing agent (core) 12 encapsulated therein. The heat-expandable microspheres have a core-shell structure, and the whole of each microsphere is thermally expandable (expandable by heating). The thermoplastic resin is produced by polymerizing a polymerizable component.

The polymerizable component is polymerized into the thermoplastic resin which forms the shell of the heat-expandable microspheres. The polymerizable component essentially contains a monomer component and optionally contains a cross-linking agent. The monomer component is a radically-polymerizable monomer having a polymerizable double bond and is polymerizable by addition polymerization. The cross-linking agent is a radically-polymerizable monomer having a plurality of polymerizable double bonds and introduces crosslinking structure in the resultant thermoplastic resin.

The polymerizable component essentially contains a nitrile monomer (A), a carboxyl-group-containing monomer (B), and a monomer (C) copolymerizable with the nitrile monomer (A) and the carboxyl-group-containing monomer (B). The nitrile monomer (A) essentially contains acrylonitrile and methacrylonitrile, and the amount of the acrylonitrile in the nitrile monomer (A) ranges from 0.1 to 9 wt % based on the nitrile monomer (A). The amount of acrylonitrile is preferably within the above range in order to produce heat-expandable microspheres having high heat resistance and good flowability. An amount of acrylonitrile less than 0.1 wt % will cause poor flowability of resultant heat-expandable microspheres. On the other hand, an amount of acrylonitrile greater than 9 wt % will cause poor flowability and lower collapsibility of the mass of resultant heat-expandable microspheres. For achieving a pronounced effect of the present invention, the amount of the acrylonitrile preferably ranges from 0.1 to 8 wt %, more preferably from 0.1 to 5 wt % and further more preferably from 0.1 to 3.5 wt %.

The monomers which constitute the nitrile monomer (A) other than acrylonitrile and methacrylonitrile include α-chloroacrylonitrile, α-ethoxyacrylonitrile and fumaronitrile.

The amount of the nitrile monomer (A) in the polymerizable component is not specifically restricted, and preferably ranges from 20 to 65 wt %, more preferably from 20 to 55 wt %, further more preferably from 25 to 50 wt % and most preferably from 25 to 45 wt %. An amount of the nitrile monomer (A) less than 20 wt % may reduce the gas barrier effect of the resultant shell which cannot retain the encapsulated blowing agent. On the other hand, an amount of the nitrile monomer (A) greater than 65 wt % may decrease the heat resistance of the resultant shell.

The carboxyl-group-containing monomer (B) is not specifically restricted except that the monomer should contain at least one free carboxyl group per molecule. The carboxyl-group-containing monomer (B) includes unsaturated monocarboxylic acids, such as acrylic acid, methacrylic acid, ethacrylic acid, crotonic acid and cinnamic acid; unsaturated dicarboxylic acids, such as maleic acid, itaconic acid, fumaric acid, citraconic acid and chloromaleic acid; anhydrides of unsaturated dicarboxylic acids; and monoesters of unsaturated dicarboxylic acids, such as monomethyl maleate, monoethyl maleate, monobutyl maleate, monomethyl fumarate, monoethyl fumarate, monomethyl itaconate, monoethyl itaconate and monobutyl itaconate. One of or a combination of at least two of these carboxyl-group-containing monomers may be used. A part of or the whole of the carboxyl groups of the carboxyl-group-containing monomers may be neutralized during or after polymerization. Of those carboxyl-group-containing monomers mentioned above, acrylic acid, methacrylic acid, maleic acid, maleic acid anhydride and itaconic acid are preferable, acrylic acid and methacrylic acid are more preferable, and, for promoting a high heat resistance of the resultant heat-expandable microspheres, methacrylic acid is most preferable.

The amount of the carboxyl-group-containing monomer (B) in the polymerizable component is not specifically restricted and preferably ranges from 25 to 75 wt %, more preferably from 30 to 65 wt %, further more preferably from 35 to 60 wt % and most preferably from 40 to 60 wt %. An amount of the carboxyl-group-containing monomer (B) less than 25 wt % may decrease the heat resistance of the resultant microspheres, while an amount of the carboxyl-group-containing monomer (B) greater than 75 wt % may cause poor flowability of the mass of the resultant microspheres.

The amounts of the nitrile monomer (A) and the carboxyl-group-containing monomer (B) in the polymerizable component should satisfy the following expression (1):

Amount of the nitrile monomer (A)<Amount of the carboxyl-group-containing monomer (B).   Expression (1)

The amount satisfying the above expression contributes to better heat resistance of the resultant microspheres and flowability of the mass of the microspheres.

The monomer (C) is not specifically restricted except that the monomer should be copolymerizable with the nitrile monomer (A) and the carboxyl-group-containing monomer. For achieving a pronounced effect of the present invention, the monomer (C) is at least one monomer selected from the group consisting of the (meth)acrylate monomer (C1), (meth)acrylamide monomer (C2), styrene monomer (C3) and monomer (C4) having a functional group reactive with the carboxyl group of the carboxyl-group-containing monomer (B).

The monomers (C1), (C2) and (C3) mentioned herein are the monomers having no functional groups reactive with the carboxyl group of the carboxyl-group-containing monomer (B). Thus the monomers (C1), (C2) and (C3) do not include the monomer (C4). The term (meth)acryl means acryl or methacryl.

The (meth)acrylate monomer (C1) is not specifically restricted and includes methyl (meth)acrylate, ethyl (meth)acrylate, n-butyl (meth)acrylate, isobutyl (meth)acrylate, t-butyl (meth)acrylate, 2-ethylhexyl (meth)acrylate, stearyl (meth)acrylate, lauryl (meth)acrylate, phenyl (meth)acrylate, isobornyl (meth)acrylate, cyclohexyl (meth)acrylate and benzyl (meth)acrylate.

The (meth)acrylamide monomer (C2) is not specifically restricted and includes acrylamide, substituted acrylamide, methacrylamide and substituted methacrylamide.

The styrene monomer (C3) is not specifically restricted and includes styrene, α-methyl styrene, vinyl toluene, t-butyl styrene, p-nitrostyrene and chloromethyl styrene.

The monomer (C4) having a functional group reactive with the carboxyl group of the carboxyl-group-containing monomer (B) is not specifically restricted and includes N-methylol (meth)acrylamide, N,N-dimethylaminoethyl (meth)acrylate, N,N-dimethylaminopropyl (meth)acrylate, vinyl glicidyl ether, propenyl glicidyl ether, glicidyl (meth)acrylate, glycerin mono(meth)acrylate, 4-hydroxybutylacrylate glicidyl ether, 2-hydroxyethyl (meth)acrylate, 2-hydroxypropyl (meth)acrylate, 2-hydroxybutyl (meth)acrylate, 4-hydroxybutyl (meth)acrylate, 2-hydroxy-3-phenoxypropyl (meth)acrylate and p-hydroxy styrene.

Of those monomers, the monomer (C) preferably has a reactivity ratio such that the product with the reactivity ratio of the monomer (A) and/or the monomer (B) is lower than 1 in order to facilitate copolymerization with the monomer (A) and the monomer (B) and to achieve good flowability of the mass of the resultant microspheres. The product of the reactivity ratios preferably ranges from 0 to 0.7 and more preferably from 0 to 0.5.

The reactivity ratios of monomers are well known to those of ordinary skill in this field of art and are reported in literature references such as Polymer Handbook (citation below). Styrene is most preferable as the monomer (C) having a reactivity ratio such that the product with the reactivity ratios of the monomers (A) and (B) is lower than 1. Preferably, monomer (C) is properly selected from the monomers (C1), (C2), (C3) and (C4) according to the desirable reactivity ratios with the monomers (A) and (B).

The reactivity ratios of the monomer components, such as the reactivity ratios of methacrylonitrile and styrene, are $r_1=0.21$ and $r_2=0.34$, according to Polymer Handbook (3rd Edition, Bradrup, J. and E. H. Immergut. Ed., JOHN WILLEY & SONS, Inc. 1989), thus the product of the ratios is $r_1r_2=0.07$. The reactivity ratios of methacrylic acid and styrene are $r_1=0.55$ and $r_2=0.21$, and the product of the ratios is $r_1r_2=0.12$.

The amount of the monomer (C) in the polymerizable component is not specifically restricted and preferably ranges from 0.3 to 45 wt %, more preferably from 1 to 35 wt %, further more preferably from 2 to 30 wt %, and most preferably from 5 to 25 wt %. An amount of the monomer (C) less than 0.3 wt % may cause poor flowability of the mass of the resultant microspheres. On the other hand, an amount of the monomer (C) greater than 45 wt % may cause poor heat resistance of the resultant microspheres and poor flowability of the mass of the microspheres.

The monomer (C) preferably contains at least one monomer selected from the monomers (C1), (C2) and (C3) and also contains the monomer (C4) for imparting better heat resistance to the resultant microspheres and achieving better flowability of the mass of the microspheres.

The amount of the monomer (C4) in the polymerizable component preferably ranges from 0.01 to 5 wt %, more preferably from 0.05 to 3 wt %, further more preferably from 0.1 to 2 wt % and most preferably from 0.3 to 1.5 wt %. An amount of the monomer (C4) less than 0.01 wt % may fail to achieve sufficient heat resistance of the resultant microspheres. On the other hand, an amount of the monomer (C4) greater than 5 wt % may cause poor expansion performance of the resultant microspheres. The amount of the at least one monomer selected from the monomers (C1), (C2) and (C3) preferably ranges from 0.3 to 44.9 wt %, more preferably from 1 to 40 wt %, further more preferably from 2 to 35 wt % and most preferably from 4 to 25 wt %.

The monomers which may be included in the monomer (C) in addition to the monomers (C1), (C2), (C3) and (C4) are, for example, vinyl ester monomers such as vinyl acetate, vinyl propionate and vinyl butyrate; maleimide monomers, such as N-phenyl maleimide and N-cyclohexyl maleimide; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts.

Vinyl halide monomers, such as vinyl chloride, and vinylidene halide monomers, such as vinylidene chloride may deteriorate the flowability of the mass of the resultant microspheres and, thus, the monomer (C) preferably does not substantially contain those monomers. Specifically, the amount of those monomers in the polymerizable component preferably is not greater than 0.1 wt %, more preferably not greater than 0.05 wt %, further more preferably not greater than 0.03 wt % and most preferably 0 wt %.

As mentioned above, the polymerizable component may contain a cross-linking agent. The polymerizable component polymerized with the cross-linking agent will control the decrease of the ratio of the blowing agent retained in thermally expanded microspheres (retention ratio of the blowing agent encapsulated in microspheres) and achieve efficient thermal expansion of the microspheres.

The cross-linking agent is not specifically restricted, and includes, for example, aromatic divinyl compounds, such as divinylbenzene; and polyfunctional (meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, neopentyl glycol di(meth)acrylate, polytetramethylene glycol di(meth)acrylate, 1,4-butanediol di(meth)acrylate, 1,6-hexanediol di(meth)acrylate, 1,9-nonanediol di(meth)acrylate, PEG (200) di(meth)acrylate, PEG (400) di(meth)acrylate, PEG (600) di(meth)acrylate, trimethylolpropane trimethacrylate, pentaerythritol tri(meth)acrylate, pentaerythritol tetraacrylate, dipentaerythritol hexaacrylate, 2-butyl-2-ethyl-1,3-propanediol diacrylate, and tricyclodecane dimethanol di(meth)acrylate. One of or a combination of at least two of those cross-linking agents may be used.

The amount of the cross-linking agent, which may not be used, is not specifically restricted, and preferably ranges from 0 to 3.0 parts by weight to 100 parts by weight of the total amount of the nitrile monomer (A), carboxyl-group-containing monomer (B) and monomer (C), more preferably from 0.02 to 1.5 parts by weight, and further more preferably from 0.02 to 1.0 parts by weight. An amount of the cross-linking agent greater than 3.0 parts by weight may result in concave heat-expandable microspheres the mass of which has poor flowability.

The blowing agent is vaporizable by heating and encapsulated in the shell of the heat-expandable microspheres to make the whole body of a heat-expandable microsphere thermally expandable (the property with which the whole body of a heat-expandable microsphere expands by heating).

The blowing agent is not specifically restricted and includes, for example, straight-chain hydrocarbons, such as propane, butane, pentane, hexane, heptane, octane, nonane, decane, dodecane, tridecane, tetradecane, pentadecane, hexadecane, heptadecane, octadecane and nonadecane; branched hydrocarbons, such as isobutene, isopentane, isohexane, isoheptane, isooctane, isononane, isodecane, isododecane, 3-methyl undecane, isotridecane, 4-methyl dodecane, isotetradecane, isopendadecane, isohexadecane, 2,2,4,4,6,8,8-heptamethylnonane, isoheptadecane, isooctadecane, isononadecane, and 2,6,10,14-tetramethyl pentadecane; alicyclic hydrocarbons, such as cyclododecane, cyclotridecane, hexylcyclohexane, heptylcyclohexane, n-octylcyclohexane, cyclopentadecane, nonylcyclohexane, decylcyclorhexane, pentadecylcyclohexane, hexadecylcyclohexane, heptadecylcyclohexane and octadecylcyclohexane; petroleum ethers; halides of the petroleum ethers; fluorine-containing compounds, such as hydrofluoroether; tetraalkyl silane; and compounds which thermally decompose to generated gases. The blowing agent may be any of straight-chain, branched or alicyclic compounds, and should preferably be an aliphatic compound.

The blowing agents may be used alone or a combination of at least two of the blowing agents may be used. Of these blowing agents, hydrocarbons having 8 or more carbon atoms per molecule are preferable for increasing the maximum expansion temperature of the resultant heat-expandable microspheres and hydrocarbons having 5 or less carbon atoms per molecule are preferable for achieving high pressure resistance of the hollow particles manufactured by heating and expanding the resultant heat-expandable microspheres.

The heat-expandable microspheres of the present invention comprise the thermoplastic resin shell produced by polymerizing the specific polymerizable component and the core of the blowing agent as mentioned above, and thus the mass of the heat-expandable microspheres (the powder material) deposited can form an angle of repose ranging from 25 to 35 degrees. The deposit of the heat-expandable microspheres which forms the angle of repose ranging from 25 to 35 degrees rarely forms a bridge in a hopper or blocks conveyor pipe. The angle of repose defined herein is the angle between the plane and the ridge line of the deposit of the heat-expandable microspheres (the powder material) with moisture content of 6 wt % or less placed on the plane at 25° C. and 40-% RH. The mass of the heat-expandable microspheres (the powder material) being prone to agglomeration makes a greater angle of repose while the mass of the heat-expandable microspheres (the powder material) being prone to flow spontaneously makes a smaller angle of repose. The angle of repose can be measured according to JIS R 9301-2-2 (Measurement of the properties of alumina powder, Angle of Repose, 1999).

For achieving a pronounced effect of the present invention, the angle of repose of the heat-expandable microspheres preferably ranges from 25 to 35 degrees, more preferably from 25 to 34 decrees, and further more preferably from 25 to 33 degrees.

The heat-expandable microspheres of the present invention comprise the thermoplastic resin shell produced by polymerizing the specific polymerizable component and the core of the blowing agent, and thus the mass of the heat-expandable microspheres (the powder material) can form a collapse angle ranging from 10 to 30 degrees. The mass of the heat-expandable microspheres forming a collapse angle ranging from 10 to 30 degrees is advantageous to easily eliminate a bridge in a hopper or blocking of conveyor pipe by vibrating or striking the facilities. The collapse angle defined herein is the angle between the plane and the ridge line of the mass of the heat-expandable microspheres (the powder material) formed by collapsing, with a certain impact, the deposit of the heat-expandable microspheres forming the above-mentioned angle of repose at 25° C. and 40-% RH. The deposit of heat-expandable microspheres (the powder material) more susceptible to collapse by vibration or impact results in a smaller collapse angle. Such heat-expandable microspheres result in better dispersion in a resin composition. This is because heat-expandable microspheres receive vibration by agitation or kneading while they are blended with the resin composition.

For achieving a more pronounced effect of the present invention, the collapse angle of the heat-expandable microspheres preferably ranges from 10 to 30 degrees, more preferably from 10 to 28 degrees and further more preferably from 10 to 25 degrees.

The mean particle size of the heat-expandable microspheres is not specifically restricted, and preferably ranges from 1 to 100 μm, more preferably from 3 to 80 μm, further more preferably from 7 to 60 μm, and most preferably from 10 to 50 μm, Heat-expandable microspheres having a mean particle size smaller than 1 μm may have a low expansion performance. On the other hand, heat-expandable microspheres having a mean particle size greater than 100 μm may have a low packing efficiency and exhibit poor workability when mixed with a resin.

The coefficient of variation, CV, of the particle size distribution of the heat-expandable microspheres is not specifically restricted, and preferably is not greater than 50%, more preferably not greater than 45%, and most preferably not greater than 40%. The CV can be calculated by the following expressions (1) and (2).

[Math. 1]

$$CV = (s/\langle x \rangle) \times 100 \, (\%) \quad (1)$$

$$s = \left\{ \sum_{i=1}^{n} (xi - \langle x \rangle)^2 / (n-1) \right\}^{1/2} \quad (2)$$

(where s is a standard deviation of the particle size of the microspheres, $\langle x \rangle$ is a mean particle size of the microspheres, "xi" is the particle size of the i-th particle, and n represents the number of particles)

The encapsulation ratio of the blowing agent is defined as the weight percentage of the blowing agent to the weight of the heat-expandable microspheres in which the blowing agent is encapsulated. The encapsulation ratio of the blowing agent is not specifically restricted, and preferably ranges from 1 to 50 wt % of the weight of the heat-expandable microspheres, more preferably from 2 to 45 wt %, further more preferably from 5 to 40 wt %, and most preferably from 10 to 30 wt %.

The expansion-initiation temperature (Ts) of the heat-expandable microspheres is not specifically restricted, and is preferably at least 100° C., more preferably at least 120° C., further more preferably at least 130° C., yet further more preferably at least 140° C., and most preferably at least 150° C. The upper limit of the expansion-initiation temperature is preferably 300° C.

The maximum expansion temperature (Tm) of the heat-expandable microspheres is not specifically restricted, and is preferably at least 150° C., more preferably at least 170° C., further more preferably at least 190° C., yet further more preferably at least 200° C., and most preferably at least 210° C. The upper limit of the maximum expansion temperature is preferably 350° C. Heat-expandable microspheres having a maximum expansion temperature lower than 150° C. may have insufficient heat resistance. On the other hand, heat-expandable microspheres having a maximum expansion temperature higher than 350° C. may not expand to a sufficient expansion ratio.

The heat-expandable microspheres of the present invention have a high maximum expansion temperature, good flowability and high heat resistance, and are preferable for application in molding processes, such as injection molding, extrusion molding, calendaring, blow molding, compaction molding, vacuum molding and thermal molding. The microspheres may also be used for blending with pastes, such as vinyl chloride paste, and liquid compositions, such as EVA emulsion, acrylate emulsion and solvent binders.

The maximum expansion ratio of the heat-expandable microspheres is not specifically restricted, and is preferably at least 3 times, more preferably at least 10 times, yet more preferably at least 20 times, further more preferably at least 30 times, yet further more preferably at least 50 times, and most preferably at least 70 times. On the other hand, the upper limit of the maximum expansion ratio should preferably be 200 times.

When the heat-expandable microspheres need to be heated and expanded into pressure-resistant hollow particles, the maximum expansion ratio of the heat-expandable microspheres is preferably at least 3 times and the upper limit of the maximum expansion ratio is 100 times in order to make hollow particles having a sufficiently thick shell. Heat-expandable microspheres having a maximum expansion ratio lower than 3 times may fail to sufficiently reduce the density of the blended material, while the heat-expandable microspheres having a maximum expansion ratio higher than 100 times may be processed into hollow particles having insufficient pressure resistance.

When a resin composition containing the heat-expandable microspheres is heated and expanded into a lightweight article, the maximum expansion ratio of the heat-expandable microspheres is preferably at least 20 times and the upper limit of the maximum expansion ratio should preferably be 200 times. Heat-expandable microspheres having a maximum expansion ratio lower than 20 times may cause insufficient expansion of the resultant product containing the heat-expandable microspheres, while heat-expandable microspheres having a maximum expansion ratio higher than 200 times may cause a rough surface of the resultant product containing the heat-expandable microspheres.

The heat-expandable microspheres of the present invention comprise the thermoplastic resin shell produced by polymerizing the specific polymerizable component and the core of the blowing agent, and thus the heat-expandable microspheres have a high resistance to thermal yellowing and minimize yellowing.

The change in the yellowness index, $\Delta YI$, of the heat-expandable microspheres is calculated by subtracting the yellowness index of the standard specimen (YI0) from the yellowness index of the heat-expandable microspheres (YI) which is measured for the heat-expandable microspheres after heating at 210° C. for 2 min.

The change in the yellowness index, $\Delta YI$, of the heat-expandable microspheres is preferably not higher than 40, more preferably not higher than 30, yet more preferably not higher than 25, further more preferably not higher than 20 and most preferably not higher than 15. Heat-expandable microspheres resulting in the change in the yellowness index higher than 40 may cause coloration of the resultant product containing the heat-expandable microspheres.

Process for Producing Heat-Expandable Microspheres

The process for producing heat-expandable microspheres of the present invention includes the steps of dispersing an oily mixture containing the polymerizable component, blowing agent and polymerization initiator in an aqueous dispersion medium, and polymerizing the polymerizable component (hereinafter also referred to as the polymerization step).

The polymerization initiator is not specifically restricted, and includes peroxides and generally used azo compounds.

The peroxides include, for example, peroxidicarbonates, such as diisopropyl peroxydicarbonate, di-sec-butyl peroxydicarbonate, di-(2-ethylhexyl) peroxydicarbonate and dibenzyl peroxydicarbonate; diacyl peroxides, such as lauroyl peroxide and benzoyl peroxide; ketone peroxides, such as methylethyl ketone peroxide and cyclohexanone peroxide; peroxyketals, such as 2,2-bis(t-butylperoxy) butane; hydroperoxides, such as cumene hydroperoxide and t-butyl hydroperoxide; dialkyl peroxides, such as dicumyl peroxide and di-t-butyl peroxide; peroxyesters, such as t-hexyl peroxypivalate and t-butyl peroxyisobutylate.

The azo compound includes, for example, 2,2'-azobis(4-methoxy-2,4-dimethyl valeronitrile), 2,2'-azobisisobutyronitrile, 2,2'-azobis(2,4-dimethyl valeronitrile), 2,2'-azobis(2-methyl propionate), 2,2'-azobis(2-methyl butylonitrile) and 1,1'-azobis(cyclohexane-1-carbonitrile).

The amount of the polymerization initiator preferably ranges from 0.05 to 10 wt % of 100 parts by weight of the polymerizable component, more preferably from 0.1 to 8 wt %, and most preferably from 0.2 to 5 wt %. An amount of the polymerization initiator lower than 0.05 wt % may leave some of the polymerizable component unpolymerized so as to cause poor flowability of the resultant heat-expandable microspheres. On the other hand, an amount of the polymerization initiator higher than 10 wt % will reduce the heat resistance of the resultant heat-expandable microspheres.

In the process of the present invention, the oily mixture is dispersed in the aqueous dispersion medium to be prepared into an aqueous suspension, and the polymerizable component is polymerized.

The aqueous dispersion medium contains water, such as deionized water, as the main component to disperse the oily mixture. The medium may further contain alcohols, such as methanol, ethanol and propanol, and hydrophilic organic solvents, such as acetone. The hydrophilic property mentioned in the present invention means a property of a substance or mixture optionally miscible in water. The amount of the aqueous dispersion medium used in the process is not specifically restricted, and preferably ranges from 100 to 1000 parts by weight to 100 parts by weight of the polymerizable component.

The aqueous dispersion medium may further contain an electrolyte, such as sodium chloride, magnesium chloride, calcium chloride, sodium sulfate, magnesium sulfate, ammonium sulfate, and sodium carbonate. One of or a combination of at least two of these electrolytes may be used. The amount of the electrolyte is not specifically restricted, and preferably ranges from 0.1 to 50 parts by weight to 100 parts by weight of the aqueous dispersion medium.

The aqueous dispersion medium may contain at least one water-soluble compound selected from the group consisting of potassium dichromate, alkali metal nitrite salts, metal (III) halides, boric acid, water-soluble ascorbic acids, water-soluble polyphenols, water-soluble vitamin Bs, water-soluble phosphonic acids and phosphonate salts, and water-soluble 1,1-substitution compounds having a carbon atom bonded with a hetero atom and with a hydrophilic functional group selected from the group consisting of hydroxyl group, carboxylic acid (salt) group and phosphonic acid (salt) group. The term "water-soluble" in the present invention means that at least 1 g of a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound may fail to achieve sufficient effect by the water-soluble compound. On the other hand, an excessive amount of the water-soluble compound may decrease the polymerization rate or increase the amount of the residue of the polymerizable component which failed to form into the microspheres.

The aqueous dispersion medium may contain a dispersion stabilizer or dispersion stabilizing auxiliary in addition to the electrolytes and water-soluble compounds.

The dispersion stabilizer is not specifically restricted, and includes, for example, calcium triphosphate; magnesium pyrophosphate and calcium pyrophosphate produced by double reaction; colloidal silica; alumina sol; and magnesium hydroxide. One of or a combination of at least two of those dispersion stabilizers may be used.

The amount of the dispersion stabilizer preferably ranges from 0.1 to 30 parts by weight to 100 parts by weight of the polymerizable component, and more preferably from 0.5 to 20 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of those dispersion stabilizing auxiliaries may be used.

The aqueous dispersion medium is prepared by blending a water-soluble compound, and optionally a dispersion stabilizer and/or dispersion stabilizing auxiliary, with water (deionized water). The pH of the aqueous dispersion medium during polymerization is adjusted depending on the variants of the water-soluble compound, dispersion stabilizer, and dispersion stabilizing auxiliary.

The polymerization in the process of the present invention may be carried out in the presence of sodium hydroxide or the combination of sodium hydroxide and zinc chloride.

In the process of the present invention, the oily mixture is dispersed and emulsified in the aqueous dispersion medium to be formed into oil globules of a prescribed particle size.

The methods for dispersing and suspending the oily mixture include generally known dispersion techniques, such as agitation with a Homo-mixer (for example, a device manufactured by Tokushu Kika Kogyou Co., Ltd.), dispersion with a static dispersing apparatus such as a Static mixer (for example, a device manufactured by Noritake Engineering Co., Ltd.), membrane suspension technique, and ultrasonic dispersion.

The suspension polymerization is then started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be set optionally depending on the variant of the polymerization initiator, and is preferably controlled within the range from 30 to 100° C., and more preferably from 40 to 90° C. The polymerization temperature is preferably maintained for about 1 to 20 hours. The initial pressure for the polymerization is not specifically restricted, and is preferably controlled within the range from 0 to 5.0 MPa in gauge pressure, and more preferably from 0.1 to 3.0 MPa.

In the process of the present invention, a metal salt may be added to the slurry after the polymerization (the dispersion liquid containing heat-expandable microspheres) to create ionic crosslinks between the metal salt and the carboxyl groups, or the heat-expandable microspheres may be surface-treated with a metal-containing organic compound.

The preferable metal salt includes a salt of a polyvalent metallic cation, for example, Al, Ca, Mg, Fe, Ti and Cu. The metal salt is preferably water-soluble for easy addition, although water-insoluble metal salts may be used. The metal-containing organic compound is preferably water-soluble for efficient surface treatment, and metal-containing organic compounds containing the metals of the groups 3 to 12 in the Periodic table are preferable for better heat resistance of the resultant microspheres.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to be processed into dry powder with a moisture content not greater than 6 wt %, preferably not greater than 5 wt % and more preferably not greater than 4 wt %.

The cake may be washed with water and/or redispersed in water and filtered again before the drying process for the purpose of decreasing the content of the ionic substances. The slurry may also be dried with a spray dryer or fluidized bed dryer to be processed into dry powder.

Hollow Particles

The hollow particles of the present invention are manufactured by heating and expanding the heat-expandable microspheres mentioned above and the heat-expandable microspheres produced in the process mentioned above. The hollow particles are lightweight and exhibit excellent properties in a composition or formed product thereof.

The hollow particles of the present invention are manufactured by heating and expanding the heat-expandable microspheres mentioned above or the heat-expandable microspheres produced in the process mentioned above. The hollow particles have good dispersibility in a base component owing to the shell composed of the thermoplastic resin produced by polymerizing the specific polymerizable component.

The process for manufacturing the hollow particles includes dry thermal expansion methods and wet thermal expansion methods, and the process includes the steps of conveying the heat-expandable microspheres in a hopper by vacuum feeding, pneumatic feeding or screw feeding.

The hollow particles of the present invention are manufactured from the heat-expandable microspheres mentioned above, which smoothly move in a hopper and exhibit good flowability in conveying. Thus, the generation of a bridge in a hopper or the blocking of conveyor pipe is minimized, so as to achieve improved processing efficiency and constant quality of the resultant hollow particles.

Blocking of conveyor pipe stops the operation and decrease the production yield. In addition, lumps of heat-expandable microspheres fed to heating process may cause agglomeration of resultant hollow particles. Such agglomeration can be confirmed by sieving the resultant hollow particles and measuring the residue on the sieve. The amount of the residue on the sieve is preferably not greater than 1.0 wt % of the sieved hollow particles, more preferably not greater than 0.8 wt %, further more preferably not greater than 0.5 wt % and most preferably not greater than 0.3 wt %, after sieving the hollow particles with a sieve having the opening about 10 times greater than the average particle size of the hollow particles.

The hollow particles of the present invention are manufactured by heating and expanding the heat-expandable microspheres mentioned above and the heat-expandable microspheres produced in the process mentioned above preferably at a temperature ranging from 100 to 400° C.

The mean particle size of the hollow particles is not specifically restricted, and is optionally designed according to the application of the particles. The mean particle size preferably ranges from 1 to 1000 µm, and more preferably from 3 to 200 µm. The coefficient of variation, CV, of the particle size distribution of the hollow particles is not specifically restricted, and is preferably not higher than 50%, and more preferably not higher than 40%.

The true specific gravity of the hollow particles is not specifically restricted, and preferably ranges from 0.005 to 0.6, more preferably from 0.015 to 0.4 and most preferably from 0.020 to 0.3. Hollow particles having a specific gravity less than 0.005 may have poor durability. On the other hand, hollow particles having a specific gravity greater than 0.6 may not cost-effective. This is because such hollow particles have a poor lightweight effect and require a high amount of the hollow particles to prepare the composition containing the hollow particles.

The change in the yellowness index, $\Delta YI$, of the hollow particles is not specifically restricted, and preferably is not higher than 40, more preferably not higher than 35, yet more preferably not higher than 30, further more preferably not higher than 25, yet further more preferably not higher than 20 and most preferably not higher than 15. The hollow particles resulting in a change in yellowness index higher than 40 may cause coloration of the formed product containing the hollow particles. The change in the yellowness index, ΔYI, of the hollow particles is determined by measuring the yellowness index of the hollow particles (YI) and subtracting the yellowness index of the standard specimen (YI0) from the YI.

The hollow particles (1) may include fine particles (4 and 5) coating the outer surface of their shell (2) as shown in FIG. 2, and such hollow particles are hereinafter also referred to as fine-particle-coated hollow particles (1).

The coating mentioned here means that the particulate filler, i.e., the fine particles (4 or 5) is in a state of adhesion (4) on the shell (2) of the hollow particles (1), or in a state of fixation in a dent (5) of the shell of the hollow particles as the result of the particulate filler pushing into the thermoplastic shell melted by heat. The particle shape of the particulate filler may be irregular or spherical.

The fine particles, which are added to the composition prepared by blending the hollow particles and the base component, can be adhered on the outer surface of the hollow particles before they are blended with the base component. Such work enables easy dispersion of the fine particles which are usually difficult to disperse uniformly.

The mean particle size of the fine particles is not specifically restricted, and is selected depending on the hollow particles to be coated. The mean particle size of the fine particles preferably ranges from 0.001 to 30 μm, more preferably from 0.005 to 25 μm, and most preferably from 0.01 to 20 μm.

The fine particles of various materials including both inorganic and organic substances may be employed. The shape of the fine particles includes spherical, needle-like and plate-like shapes.

The fine particles include, for example, organic fine particles including metal soaps such as magnesium stearate, calcium stearate, zinc stearate, barium stearate and lithium stearate; synthetic waxes, such as polyethylene wax, lauric amide, myristic amide, palmitic amide, stearic amide and hydrogenated castor oil; and organic fillers, such as polyacrylamide, polyimide, nylon, polymethylmethacrylate, polyethylene and polytetrafluoroethylene. Examples of inorganic fine particles include talc, mica, bentonite, sericite, carbon black, molybdenum disulfide, tungsten disulfide, carbon fluoride, calcium fluoride and boron nitride; and other inorganic fillers, such as silica, alumina, isinglass, colloidal calcium carbonate, heavy calcium carbonate, calcium hydroxide, calcium phosphate, magnesium hydroxide, magnesium phosphate, barium sulfate, titanium dioxide, zinc oxide, ceramic beads, glass beads, and crystal beads.

The mean particle size of the fine particles preferably is not greater than 10% of the mean particle size of the fine-particle-coated hollow particles. The mean particle size mentioned here is the mean particle size of the primary particles.

The fine-particle-coated hollow particles are useful for preparing a paint composition or adhesive composition by blending the hollow particles in the compositions mentioned below.

The fine-particle-coated hollow particles can be manufactured by heating and expanding the fine-particle-coated heat-expandable microspheres. The preferable process for producing the fine-particle-coated hollow particles includes the steps of blending heat-expandable microspheres and fine particles (blending step), and heating the mixture prepared in the blending step at a temperature higher than the softening point mentioned above to expand the heat-expandable microspheres and simultaneously adhere the fine particles on the outer surface of the shell of the resultant hollow particles (adhering step).

The true specific gravity of the fine-particle-coated hollow particles is not specifically restricted, and preferably ranges from 0.01 to 0.6, more preferably from 0.03 to 0.5, further more preferably from 0.05 to 0.4, and most preferable from 0.07 to 0.3. The fine-particle-coated hollow particles having a true specific gravity less than 0.01 may have poor durability. On the other hand, fine-particle-coated hollow particles having a true specific gravity greater than 0.6 may not be cost-effective. This is because such fine-particle-coated hollow particles have a poor lightweight effect and require a high amount of the fine-particle-coated hollow particles to prepare the composition containing the fine-particle-coated hollow particles.

Compositions and Formed Products

The composition of the present invention contains at least one particulate material selected from the group consisting of the heat-expandable microspheres of the present invention, the heat-expandable microspheres produced in the process of the present invention and the hollow particles of the present invention, and a base component.

The base component is not specifically restricted, and includes, for example, rubbers, such as natural rubbers, isoprene rubber (IR), butadiene rubber (BR), styrene-butadiene rubber (SBR), chloroprene rubber (CR), nitrile rubber (NR), butyl rubber, silicone rubber, acrylic rubber, urethane rubber, fluororubber and ethylene-propylene-diene rubber (EPDM); thermosetting resins, such as epoxy resins, phenolic resins, unsaturated polyester resins and polyurethane; waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66 etc.), modified polyamide, polycarbonate, polyethylene terephthalate (PET), polybutylene terephthalate (PBT), polyacetal (POM), polyphenylene sulfide (PPS), polyphenylene ether (PPE) and modified polyphenylene ether; ionomer resins, such as ethylene ionomers, urethane ionomers, styrene ionomers and fluorine ionomers; thermoplastic elastomers, such as olefin elastomers, styrene elastomers and polyester elastomers; bioplastics, such as polylactic acid (PLA), cellulose acetate, PBS, PHA and starch resins; sealing materials, such as modified silicones, polyurethanes, polysulfides, acrylates, silicones, polyisobutylenes and butyl rubbers; paint components, such as urethane polymers, ethylene-vinyl acetate copolymers, vinyl chloride polymers and acrylate polymers; and inorganic materials, such as cement, mortar and cordierite.

The composition of the present invention is prepared by mixing these base components and the heat-expandable microspheres and/or hollow particles. The composition prepared by mixing the base component and heat-expandable microspheres and/or hollow particles may be blended with another base component to be prepared into the composition of the present invention.

The amount of the heat-expandable microspheres and/or hollow particles preferably ranges from 0.1 to 70 parts by weight to 100 parts by weight of the base component, more preferably from 0.5 to 65 parts by weight and further more preferably from 1 to 60 parts by weight.

The process for mixing the ingredients is not specifically restricted, and the ingredients are preferably mixed with a kneader, roller kneader, mixing roller, mixer, single screw kneader, twin screw kneader or multi-screw kneader.

The application of the composition of the present invention includes, for example, molding compositions; paint compositions, clay compositions, fiber compositions, adhesive compositions and powder compositions.

The composition of the present invention can be used as the master batch for resin molding if the composition contains the heat-expandable microspheres and the base component including the compounds and/or thermoplastic resins having a melting point lower than the expansion initiation temperature of the heat-expandable microspheres (for example, waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET), and polybutylene terephthalate (PBT); ionomer resins, such as ethylene ionomers, urethane ionomers, styrene ionomers, and fluorine ionomers; and thermoplastic elastomers, such as olefin elastomers, styrene elastomers and polyester elastomers). The master-batch composition for resin molding is preferably employed in injection molding, extrusion molding and press molding for the purpose of introducing bubbles into molded products. Resins used for resin molding can be selected from the base component mentioned above without restriction, and include, for example, ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66, etc.), modified polyamide, polycarbonate, polyethylene terephthalate (PET), polybutylene terephthalate (PBT), polyacetal (POM), polyphenylene sulfide (PPS), polyphenylene ether (PPE), modified polyphenylene ether, ionomer resins, olefin elastomers, styrene elastomers, polyester elastomers, poly-lactic acid (PLA), cellulose acetate, PBS, PHA, starch resins, natural rubbers, isoprene rubber (IR), butadiene rubber (BR), styrene-butadiene rubber (SBR), chloroprene rubber (CR), nitrile rubber (NR), butyl rubber, silicone rubber, acrylic rubber, urethane rubber, fluororubber, ethylene-propylene-diene rubber (EPDM), and their mixtures. The composition may optionally contain reinforcing fibers, such as glass fiber, carbon fiber and natural fibers; inorganic powders, such as talc, titanium oxide, silica and inorganic pigments; organic powders, such as polymer particulates including acrylic particulate, styrene particulate, urethane particulate and silicone particulate, and organic pigments; flame retardants; and chemical blowing agents.

The formed product of the present invention can be manufactured by forming (e.g., molding or applying a coat of the composition). The formed product of the present invention includes, for example, molded products and coating films. The formed product of the present invention has an improved lightweight effect, porosity, sound absorbing performance, thermal insulation, design potential, shock absorbing performance and strength, and low thermal conductivity and dielectric property.

The formed product of the present invention is preferably colored to a minimum degree in heat treatment at high temperature. The change in the yellowness index, $\Delta YI$, of the formed product is preferably not higher than 40, more preferably not higher than 30, yet more preferably not higher than 25, further more preferably not higher than 20, yet further more preferably not higher than 15, and most preferably not higher than 10.

The formed product containing inorganic materials as the base component can be further burnt to be processed into ceramic filters and the like.

The composition and formed product of the present invention contains at least one particulate material selected from the group consisting of the heat-expandable microspheres of the present invention, the heat-expandable microspheres produced in the process of the present invention and the hollow particles of the present invention, which can be uniformly dispersed in the base component and rarely cause uneven dispersion or agglomeration. Thus the formed product has good appearance and high strength.

EXAMPLE

Examples of the heat-expandable microspheres of the present invention are specifically described below, although the present invention is not restricted within the scope of these examples. The percentage (%) mentioned in the following examples and comparative examples means weight percent (wt %) unless otherwise specified.

The properties of the heat-expandable microspheres, hollow particles, compositions, and formed products were measured and their performances were evaluated by the following methods. The heat-expandable microspheres may also be hereinafter referred to as "microspheres" for concise expression.

Determination of the Mean Particle Size

A sample of microspheres was analyzed with a laser diffraction-scattering particle size analyzer (Microtrac ASVR, supplied by Nikkiso). The mean volume diameter $D_{50}$ determined in the analysis was defined as the mean particle size.

Determination of the Moisture Content of Microspheres

The moisture content of a sample of microspheres was determined with a Karl Fischer moisture meter (MKA-510N, manufactured by Kyoto Electronics Manufacturing Co., Ltd.).

Determination of the Expansion-Initiation Temperature (Ts) and the Maximum Expansion Temperature (Tm) of Heat-Expandable Microspheres The maximum expansion temperature was determined with a DMA (DMA Q800, manufactured by TA Instruments). In an aluminum cup of 4.8 mm deep and 6.0 mm in diameter, 0.5 mg of a sample of heat-expandable microspheres was placed, and the cup was covered with an aluminum cap (5.6 mm in diameter and 0.1 mm thick) to prepare a test sample. The test sample was set on the device and subjected to the pressure of 0.01 N with the compression unit of the device, and the height of the sample ($H_0$) was measured. The sample was then heated at temperatures elevating at a rate of 10° C./min in the temperature range from 20 to 350° C., being subjected to the pressure of 0.01 N with the compression unit, and the change in the height of the sample was measured. The temperature at which the height started to increase was determined as the expansion-initiation temperature (Ts) and the temperature at which the compression unit indicated the highest position (D max) was determined as the maximum expansion temperature ($T_m$).

Determination of the Angle of Repose and the Collapse Angle

The angle of repose and the collapse angle of the mass of the microspheres were measured with a multifunctional powder property tester (Multi Tester MT-1001, manufactured by SEISHIN ENTERPRISE Co., Ltd.) at 25° C. and 40-% RH.

Dispersibility 1: Determination of the Dispersibility of Microspheres in Liquid

In a 500-ml beaker, 500 g of water was poured and then 25 g of the resultant microspheres were gently added to the water. Then the water and the microspheres were agitated at 90 rpm, and the time required for the microspheres initially floating on the water surface to be uniformly dispersed in the water.

Dispersibility 2: Determination of the Dispersibility of Microspheres in Resin

In a 1-liter kneader heated at 100° C., 450 g of ethylene vinyl-acetate copolymer (Ultrathene 720, supplied by Tosoh Corporation) was added and melted. Then 50 g of the resultant microspheres were added to the melt, mixed by kneading for 1 minute and spread into a 0.5-mm-thick sheet with rollers. The dispersion of the microspheres was inspected visually and through an optical microscope.

The dispersion of the microspheres was evaluated according to the following criteria.

A: uniformly dispersed microspheres with no agglomeration

B: small white spots (which were detected to be the agglomeration of the microspheres through optical microscope) showing partially uneven dispersion of microspheres C: considerably large white spots Example 1

An aqueous dispersion medium was prepared by adding 150 g of sodium chloride, 50 g of colloidal silica containing 20 wt % of silica, 4.0 g of polyvinyl pyrolidone and 1.0 g of ethylenediaminetetraaceticacid tetrasodiumsalt to 600 g of deionized water and controlling the pH of the mixture within the range from 2.0 to 3.0.

An oily mixture was prepared by mixing 4 g of acrylonitrile, 114 g of methacrylonitrile, 153 g of methacrylic acid, 15 g of methacrylamide, 15 g of styrene, 0.06 g of 1,9-nonanediol diacrylate, 30 g of isopentane, 30 g of isooctane and 8 g of the liquid containing 50% of di-sec-butyl peroxydicarbonate.

The aqueous dispersion medium and the oily mixture were mixed and agitated with a Homo-mixer to be prepared into a suspension. Then the suspension was transferred to a compressive reactor of 1.5-liter capacity, purged with nitrogen, and polymerized at 60° C. for 20 hours with agitation under the initial reaction pressure of 0.2 MPa. The resultant polymerization product was filtered and dried to be made into heat-expandable microspheres. The mean particle size, expansion-initiation temperature, maximum expansion temperature, moisture content, angle of repose, collapse angle, dispersibility 1 and dispersibility 2 of the resultant heat-expandable microspheres were determined. The result is shown in Table 1.

Example 2

An aqueous dispersion medium was prepared by adding 150 g of sodium chloride, 20 g of colloidal silica containing 20 wt % of silica, 20 g of alumina sol containing 20 wt % of alumina and 3.0 g of adipic acid-diethanolamine condensate to 600 g of deionized water and controlling the pH of the mixture within the range from 3.0 to 4.0.

Heat-expandable microspheres were produced in the same manner as in Example 1 except that the oily mixture was replaced as shown in Table 1. The mean particle size, expansion-initiation temperature, maximum expansion temperature, moisture content, angle of repose, collapse angle, dispersibility 1 and dispersibility 2 of the resultant heat-expandable microspheres were determined. The result is shown in Table 1.

Examples 3 to 22 and Comparative Examples 1 to 8

Heat-expandable microspheres were produced in the same manner as in Example 1 except that the oily mixture was replaced as shown in Tables 1 to 4. The mean particle size, expansion-initiation temperature, maximum expansion temperature, moisture content, angle of repose, collapse angle, dispersibility 1 and dispersibility 2 of the resultant heat-expandable microspheres were determined. The result is shown in Tables 1 to 4.

Comparative Example 9

Heat-expandable microspheres were produced in the same manner as in Example 1 except that sodium chloride was not added to the aqueous dispersion medium and the oily mixture was replaced as shown in Table 4. The mean particle size, expansion-initiation temperature, maximum expansion temperature, moisture content, angle of repose, collapse angle, dispersibility 1 and dispersibility 2 of the resultant heat-expandable microspheres were determined. The result is shown in Table 4.

TABLE 1

| Oily mixture | | Example | | | | | | | | |
|---|---|---|---|---|---|---|---|---|---|---|
| | | 1 | 2 | 3 | 4 | 5 | 6 | 7 | 8 | 9 |
| Monomer (A) | AN | 4 | 1 | 0.3 | 3 | 5 | 3 | 12 | 3 | 7 |
| | MAN | 114 | 135 | 90 | 102 | 60 | 135 | 180 | 114 | 75 |
| Monomer (B) | MAA | 153 | 162 | 192 | 120 | 210 | 117 | 96 | 177 | 150 |
| | AA | | | | | | | | | |
| Monomer (C) | MAM | 15 | 1 | 9 | 30 | | 15 | 12 | | 30 |
| | MMA | | | | | | | | 3 | |
| | EMA | | | | | | | | | |
| | AAM | | | | | | | | | 8 |
| | MA | | | | | | | | | |
| | IBX | | | | | | | | | |
| | St | 15 | 1 | 9 | 45 | 25 | 30 | | 3 | 30 |

TABLE 1-continued

| Oily mixture | | 1 | 2 | 3 | 4 | Example 5 | 6 | 7 | 8 | 9 |
|---|---|---|---|---|---|---|---|---|---|---|
| | HOA | | | | | | | | | |
| | GMA | | | | | | | | | |
| | VCl2 | | | | | | | | | |
| Cross-linking agent | 1.9ND-A | 0.06 | | 0.3 | | 0.3 | | 0.6 | | 0.3 |
| | TMP | | | | | | 0.06 | | | |
| Blowing agent | Isopentane | 30 | 15 | | | | | 15 | 45 | 30 |
| | Isooctane | 30 | 60 | 75 | 75 | 45 | 75 | 60 | 45 | 30 |
| | Isododecane | | | | | 30 | | | | |
| Amount of AN in Monomer (A) (wt %) | | 3.4 | 0.7 | 0.3 | 2.9 | 7.7 | 2.2 | 6.3 | 2.6 | 8.3 |
| Amount of Monomer A (wt %) | | 39.2 | 45.3 | 30.0 | 35.0 | 21.6 | 46.0 | 63.9 | 39.0 | 27.3 |
| Amount of Monomer B (wt %) | | 50.8 | 54.0 | 63.9 | 40.0 | 69.9 | 39.0 | 31.9 | 59.0 | 50.0 |
| Amount of Monomer C (wt %) | | 10.0 | 0.7 | 6.0 | 25.0 | 8.3 | 15.0 | 4.0 | 2.0 | 22.6 |
| Mean particle size (μm) | | 16 | 25 | 28 | 30 | 20 | 35 | 26 | 25 | 17 |
| Moisture content (%) | | 3.0 | 2.5 | 2.8 | 3.2 | 4.0 | 3.0 | 1.5 | 3.5 | 3.8 |
| Expansion initiation temp.(Ts, °C.) | | 190 | 185 | 204 | 207 | 209 | 202 | 170 | 189 | 183 |
| Maximum expansion temp.(Tm, °C.) | | 230 | 225 | 237 | 228 | 245 | 220 | 210 | 229 | 230 |
| Highest position (Dmax, μm) | | 2260 | 1970 | 1940 | 2830 | 2100 | 2240 | 2400 | 2330 | 1480 |
| Angle of repose (deg.) | | 27 | 31 | 34 | 34 | 33 | 34 | 35 | 30 | 34 |
| Collapse angle (deg.) | | 17 | 28 | 20 | 19 | 27 | 29 | 30 | 24 | 28 |
| Dispersibility 1 (min) | | 3 | 5 | 5 | 4 | 6 | 7 | 8 | 5 | 7 |
| Dispersibility 2 | | A | A | A | A | A | A | A | A | A |

TABLE 2

| Oily mixture | | | 10 | 11 | 12 | 13 | Example 14 | 15 | 16 | 17 | 18 |
|---|---|---|---|---|---|---|---|---|---|---|---|
| Monomer (A) | AN | | 3 | 11 | 6 | 4 | 5 | 5 | 10 | 4 | 2 |
| | MAN | | 66 | 124 | 120 | 126 | 160 | 130 | 156 | 135 | 130 |
| Monomer (B) | MAA | | 99 | 77 | 127 | 165 | 120 | 153 | 120 | 100 | 130 |
| | AA | | | | | | | | | 43 | 10 |
| Monomer (C) | MAM | | 33 | | 30 | | | | | 8 | |
| | MMA | | 33 | 43 | | | | | 10 | | 5 |
| | EMA | | | | | | | | 5 | | |
| | AAM | | | | | | | | | | |
| | MA | | | | | | 10 | | | | |
| | IBX | | | | | | | 12 | | | 5 |
| | St | | 66 | 43 | 14 | | | | | 10 | 15 |
| | HOA | | | | 3 | 3 | | | | | |
| | GMA | | | | | | | | | | 2 |
| | VCl2 | | | | | | | | | | |
| Cross-linking agent | 1.9ND-A | | 0.45 | 0.45 | 1.5 | 1 | | 0.5 | 1 | | |
| | TMP | | | | | | | | | | |
| Blowing agent | Isopentane | | 30 | 15 | | | 30 | 25 | 40 | 10 | |
| | Isooctane | | 30 | 45 | 60 | 30 | 30 | 40 | 20 | 50 | 60 |
| | Isododecane | | 15 | 15 | 15 | 40 | | | | | |
| Amount of AN in Monomer (A) (wt %) | | | 4.3 | 8.1 | 4.8 | 3.2 | 3.0 | 3.7 | 6.0 | 2.9 | 1.5 |
| Amount of Monomer A (wt %) | | | 23.0 | 45.2 | 41.5 | 43.5 | 55.9 | 44.9 | 55.0 | 46.3 | 44.1 |
| Amount of Monomer B (wt %) | | | 33.0 | 25.8 | 42.1 | 55.2 | 40.7 | 50.9 | 39.7 | 47.7 | 46.8 |
| Amount of Monomer C (wt %) | | | 43.9 | 28.8 | 15.6 | 1.0 | 3.4 | 4.0 | 5.0 | 6.0 | 9.0 |
| Mean particle size (μm) | | | 33 | 28 | 20 | 25 | 25 | 30 | 26 | 18 | 22 |
| Moisture content (%) | | | 2.2 | 1.8 | 2.5 | 3.2 | 3.6 | 2.8 | 2.4 | 3.7 | 2.4 |
| Expansion initiation temp.(Ts, °C.) | | | 170 | 163 | 207 | 250 | 165 | 183 | 163 | 190 | 205 |
| Maximum expansion temp.(Tm, °C.) | | | 195 | 191 | 252 | 283 | 212 | 225 | 200 | 223 | 247 |
| Highest position (Dmax, μm) | | | 1540 | 2000 | 2660 | 2010 | 1780 | 1850 | 1660 | 1900 | 1760 |
| Angle of repose (deg.) | | | 34 | 35 | 34 | 33 | 34 | 33 | 35 | 33 | 34 |
| Collapse angle (deg.) | | | 28 | 29 | 20 | 28 | 29 | 27 | 29 | 26 | 27 |
| Dispersibility 1 (min) | | | 7 | 7 | 6 | 6 | 7 | 6 | 8 | 6 | 7 |
| Dispersibility 2 | | | A | A | A | A | A | A | A | A | A |

TABLE 3

| Oily mixture | | Example 19 | 20 | 21 | 22 |
|---|---|---|---|---|---|
| Monomer (A) | AN | 10 | 3 | 5 | 2 |
| | MAN | 130 | 150 | 120 | 140 |
| Monomer (B) | MAA | 155 | 140 | 145 | 80 |
| | AA | | | | |

TABLE 3-continued

| Oily mixture | | Example 19 | Example 20 | Example 21 | Example 22 |
|---|---|---|---|---|---|
| Monomer (C) | MAM | | | 20 | 75 |
| | MMA | | 6 | | |
| | EMA | | | | |
| | AAM | | | | |
| | MA | | | | |
| | IBX | | | | |
| | St | | | 7 | 3 |
| | HOA | | | | |
| | GMA | 2 | | 3 | |
| | VCl2 | | | | |
| Cross-linking agent | 1.9ND-A | | | | 0.3 |
| | TMP | | 0.5 | | |
| Blowing agent | Isopentane | 20 | | 30 | |
| | Isooctane | 40 | 60 | 30 | 80 |
| | Isododecane | | | | |
| Amount of AN in Monomer (A) (wt %) | | 7.1 | 2.0 | 4.0 | 1.4 |
| Amount of Monomer A (wt %) | | 47.1 | 51.1 | 41.7 | 47.3 |
| Amount of Monomer B (wt %) | | 52.2 | 46.7 | 48.3 | 26.6 |
| Amount of Monomer C (wt %) | | 0.7 | 2.0 | 10.0 | 30.0 |
| Mean particle size (μm) | | 14 | 32 | 38 | 42 |
| Moisture content (%) | | 3.6 | 3.1 | 2.5 | 2.2 |
| Expansion initiation temp. (Ts, °C.) | | 195 | 206 | 189 | 205 |
| Maximum expansion temp. (Tm, °C.) | | 235 | 232 | 245 | 248 |
| Highest position (Dmax, μm) | | 2100 | 2240 | 2680 | 2320 |
| Angle of repose (deg.) | | 35 | 33 | 32 | 32 |
| Collapse angle (deg.) | | 28 | 26 | 26 | 24 |
| Dispersibility 1 (min) | | 7 | 6 | 6 | 6 |
| Dispersibility 2 | | A | A | A | A |

The names of the monomer components and cross-linking agents are abbreviated in Tables 1 to 5 as described below.
AN: acrylonitrile
MAN: methacrylonitrile
MAA: methacrylic acid
AA: acrylic acid
MAM: methacrylamide
MMA: methyl methacrylate
EMA: ethyl methacrylate
AAM: acrylamide
MA: methyl acrylate
IBX: isobornyl methacrylate
St: styrene
HOA: 2-hydroxyethyl acrylate
GMA: glycidyl methacrylate
VC12: vinylidene chloride monomer
1.9ND-A: 1.9-nonanediol diacrylate
TMP: trimethylolpropane trimethacrylate Example 23

The ethylene-vinyl-acetate resin sheet containing the microspheres, which was prepared (from the composition containing the microspheres) for determining the dispersibility 2 of the microspheres of Example 1, was heated in hot air at 230° C. for 1 min to be processed into the expanded sheet having a specific gravity of 0.33. The expanded sheet was inspected and the bubbles in the sheet were uniformly distributed. The change in the yellowness index of the expanded sheet was 10, indicating a high whiteness of the sheet.

TABLE 4

| Oily mixture | | Comparative Example 1 | 2 | 3 | 4 | 5 | 6 | 7 | 8 | 9 |
|---|---|---|---|---|---|---|---|---|---|---|
| Monomer (A) | AN | 0 | 0 | 0 | 5 | 45 | 45 | 120 | 180 | 110 |
| | MAN | 132 | 147 | 150 | 125 | 120 | 69 | 70 | 90 | |
| Monomer (B) | MAA | 168 | 138 | 60 | 170 | 135 | 102 | 90 | | |
| | AA | | | | | | | | | |
| Monomer (C) | MAM | | | | | | | 10 | | |
| | MMA | | 30 | 90 | | | 84 | | 10 | 10 |
| | EMA | | | | | | | | | |
| | AAM | | | | | | | | | |
| | MA | | | | | | | | | |
| | IBX | | | | | | | | | |
| | St | | | | | | | 10 | | |
| | HOA | | | | | | | | | |
| | GMA | | | | | | | | | |
| | VCl2 | | | | | | | | | 200 |
| Cross-linking agent | 1.9ND-A | | | | | | | | | |
| | TMP | | | | | 1 | 1.2 | | 1.5 | |
| Blowing agent | Isopentane | | | 60 | | | 40 | 40 | 70 | 80 |
| | Isooctane | 90 | 90 | 30 | 30 | 85 | 40 | 40 | | |
| | Isododecane | | | | 50 | | | | | |
| Amount of AN in Monomer (A) (wt %) | | 0.0 | 0.0 | 0.0 | 3.8 | 27.3 | 39.5 | 63.2 | 66.7 | 100.0 |
| Amount of Monomer A (wt %) | | 44.0 | 49.0 | 50.0 | 43.3 | 54.8 | 37.8 | 63.3 | 95.9 | 34.4 |
| Amount of Monomer B (wt %) | | 56.0 | 46.0 | 20.0 | 56.7 | 44.9 | 33.9 | 30.0 | 0.0 | 0.0 |
| Amount of Monomer C (wt %) | | 0.0 | 5.0 | 30.0 | 0.0 | 0.0 | 27.9 | 6.7 | 3.6 | 65.6 |
| Mean particle size (μm) | | 40 | 24 | 23 | 32 | 25 | 24 | 15 | 22 | 18 |
| Moisture content (%) | | 3.5 | 3.0 | 2.5 | 2.8 | 2.0 | 2.5 | 3.0 | 1.5 | 0.8 |
| Expansion initiation temp.(Ts, °C.) | | 197 | 184 | 183 | 242 | 198 | 175 | 185 | 125 | 80 |
| Maximum expansion temp.(Tm, °C.) | | 218 | 226 | 202 | 256 | 223 | 218 | 224 | 168 | 118 |
| Highest position (Dmax, μm) | | 1600 | 1680 | 800 | 1780 | 1750 | 1520 | 2200 | 2080 | 1380 |
| Angle of repose (deg.) | | 37 | 37 | 37 | 36 | 36 | 39 | 38 | 39 | 41 |
| Collapse angle (deg.) | | 31 | 29 | 32 | 31 | 32 | 34 | 35 | 35 | 38 |
| Dispersibility 1 (min) | | 11 | 11 | 13 | 11 | 12 | 13 | 16 | 16 | 30 |
| Dispersibility 2 | | B | B | B | B | B | B | B | C | C |

Comparative Example 10

The ethylene-vinyl-acetate resin sheet containing the microspheres, which was prepared for determining the dispersibility 2 of the microspheres of Comparative Example 7, was heated in hot air at 230° C. for 1 min to be processed into the expanded sheet having a specific gravity of 0.35. The sheet was non-uniformly expanded and contained aggregated microspheres. The change in the yellowness index of the expanded sheet was 54, indicating a considerable yellowing of the sheet.

The heat-expandable microspheres of Examples 1 to 22 expanded sufficiently at a high temperature at least 190° C. to exhibit a high heat resistance. The mass of the microspheres also exhibited good flowability to form an angle of repose not greater than 35 degrees. The collapse angle of the mass of the microspheres was not greater than 30 degrees. This indicates that the microspheres are not apt to agglomerate or the deposit of the microspheres is susceptible to collapse. Thus the microspheres readily disperse in the base component.

The good dispersibility of the microspheres in the base component enables uniform distribution of bubbles in a lightweight formed product manufactured by heating the composition of the microspheres and the base component as described in Example 23, and the resultant product has good appearance and high strength.

To the contrary, the heat-expandable microspheres of Comparative Examples 1 to 9 exhibited poor flowability to form an angle of repose greater than 35 degrees. The collapse angle of the mass of the microspheres was greater than 29 degrees, indicating that the microspheres are apt to agglomerate. Thus the microspheres require a considerably long time to disperse in the base component to thereby make the operation cumbersome. Insufficiently dispersed microspheres in the base component often agglomerate in the composition and in the resultant formed products as mentioned in Comparative Example 10. Further, the resultant formed products have poor appearance and decreased strength originating from the agglomerated microspheres.

Example 24

Heat-expandable microspheres were produced in the same manner as in Example 2, except that the blowing agents were decreased to 5 g of isopentane and 20 g of isooctane. The resultant heat-expandable microspheres were heated at 230° C. for 2 min to be processed into hollow particles. The mean particle sizes of the heat-expandable microspheres and hollow particles and the specific gravity of the hollow particles are shown in Table 5.

With a twin-screw extruder, 20 g of the resultant hollow particles and 380 g of polypropylene (having the melting point of 170° C.) as the base component were processed at 190° C., and the base component was melted and mixed with the hollow particles. The hollow particles exhibited good workability in mixing with the base component. Then, the resultant mixture was processed into 3 mm×3 mm pellets to be prepared into a masterbatch containing 5 wt % of the hollow particles.

The resultant masterbatch was processed by injection molding at 200° C. to be manufactured into a lightweight formed product. The specific gravity of the formed product and the dispersibility of the hollow particles are shown in Table 5.

The dispersibility of the hollow particles was checked by inspecting the cross section of the formed product through an electron microscope. The electron micrograph of the cross section is shown as FIG. 3. The dispersibility of the hollow particles was determined as follows.

The cross section of the formed product was sectioned into 1-mm squares, and agglomerates of the hollow particles in each square were counted. The hollow particles making at least one agglomerate in the sections were evaluated to have poor (C) dispersibility, and the hollow particles making no agglomerates in the sections were evaluated to have sufficient (A) dispersibility. The agglomerate mentioned here is composed of at least five hollow particles fused and deformed.

Comparative Example 11

Heat-expandable microspheres, hollow particles, a composition and a formed product were prepared in the same manner as in Example 24, except that the oily mixture was replaced as shown in Table 5. The mean particle sizes of the resultant heat-expandable microspheres and hollow particles, the specific gravity of the hollow particles and formed product, and the dispersibility of the hollow particles are shown in Table 5. The electron micrograph of the cross section of the formed product is shown as FIG. 4.

TABLE 5

| Oily mixture | | Example 24 | Comparative Example 11 |
|---|---|---|---|
| Monomer (A) | AN | 1 | 45 |
|  | MAN | 135 | 120 |
| Monomer (B) | MAA | 162 | 135 |
|  | AA |  |  |
| Monomer (C) | MAM | 1 |  |
|  | MMA |  |  |
|  | EMA |  |  |
|  | AAM |  |  |
|  | MA |  |  |
|  | IBX |  |  |
|  | St | 1 |  |
|  | HOA |  |  |
|  | GMA |  |  |
|  | VCl2 |  |  |
| Cross-linking agent | 1,9ND-A |  |  |
|  | TMP |  | 1 |
| Blowing agent | Isopentane | 5 |  |
|  | Isooctane | 20 | 25 |
|  | Isododecane |  |  |
| Amount of AN in Monomer (A) (wt %) | | 0.7 | 27.3 |
| Amount of Monomer A (wt %) | | 45.3 | 54.8 |
| Amount of Monomer B (wt %) | | 54.0 | 44.9 |
| Amount of Monomer C (wt %) | | 0.7 | 0.0 |
| Mean particle size (μm) | | 15 | 15 |
| Mean particle size of hollow particles (μm) | | 27.0 | 26.0 |
| Specific gravity of hollow particles | | 0.18 | 0.19 |
| Specific gravity of formed product | | 0.84 | 0.87 |
| Theoretical specific gravity of formed product | | 0.86 | 0.86 |
| Dispersibility of hollow particles | | A | C |

The heat-expandable microspheres and hollow particles of Example 24 have a high heat resistance and can be processed into a lightweight formed product even if they are mixed and kneaded with the base component and heated and formed at high temperature. The hollow particles have dispersed uniformly in the resultant formed product and achieved a lightweight formed product having the theoretically predicted specific gravity.

The high-heat resistance and excellent expansion performance of the heat-expandable microspheres and hollow particles allow them to re-expand by heating in a molding operation and thus enable the production of a lightweight formed product having a specific gravity lower than that theoretically predicted.

To the contrary, the heat-expandable microspheres and hollow particles of Comparative Example 11 have inferior dispersibility and agglomerate in the formed product (as those appearing at the lower left and upper left, and those appearing diagonally from the center to upper right of the photo of FIG. 4). The resultant formed product has a specific gravity greater than that theoretically predicted. The reason is considered to be non-uniformly dispersed hollow particles (bubbles) in the product due to agglomeration of the particles.

INDUSTRIAL APPLICABILITY

The heat-expandable microspheres of the present invention can be used as a lightweight additive for putties, paints, inks, sealants, mortar, paper clay, ceramic, etc., and also as an additive to the base components processed in injection molding, extrusion molding and press molding to be made into formed products having excellent sound insulation, thermal insulation, heat-shielding, and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. Heat-expandable microspheres comprising a thermoplastic resin shell and a thermally-vaporizable blowing agent encapsulated therein:
    wherein the thermoplastic resin is produced by polymerizing a polymerizable component comprising (A) a nitrile monomer containing acrylonitrile and methacrylonitrile, (B) a carboxyl-group-containing monomer, and (C) a monomer copolymerizable with the nitrile monomer (A) and the carboxyl-group-containing monomer (B);
    the amount of the acrylonitrile in the nitrile monomer (A) ranges from 0.1 to 8.3 wt % based on the nitrile monomer (A);
    the amounts of the nitrile monomer (A) and the carboxyl-group-containing monomer (B) in the polymerizable component satisfy the following expression (1):

Amount of the nitrile monomer (A)<Amount of the carboxyl-group-containing monomer (B);

the monomer (C) is a radically polymerizable monomer having one polymerizable double bond, and the monomer (C) comprises at least one monomer selected from the group consisting of (C1) (meth)acrylate monomer, (C2) (meth)acrylamide monomer, (C3) styrene monomer and (C4) a monomer having a functional group reactive with the carboxyl group of the carboxyl-group-containing monomer (B); and the polymerizable component contains 20 to 65 wt % of the nitrile monomer (A), 25 to 75 wt % of the carboxyl-group-containing monomer (B) and 0.3 to 45 wt % of the monomer (C).

2. The heat-expandable microspheres as claimed in claim 1, wherein the amount of the acrylonitrile in the nitrile monomer (A) ranges from 0.1 to 3.5 wt % based on the nitrile monomer (A).

3. The heat-expandable microspheres as claimed in claim 1, wherein the monomer (C) comprises the monomer (C4) and at least one monomer selected from the group consisting of the (meth)acrylate monomer (C1), the (meth)acrylamide monomer (C2) and the styrene monomer (C3).

4. The heat-expandable microspheres as claimed in claim 1, wherein the maximum expansion temperature of the heat-expandable microspheres is not lower than 190° C.

5. Hollow particles manufactured by heating and expanding the heat-expandable microspheres as claimed in claim 1.

6. A composition containing a base component and the heat-expandable microspheres as claimed in claim 1.

7. A formed product manufactured by molding or applying a coat of the composition as claimed in claim 6.

8. A composition containing a base component and hollow particles manufactured by heating and expanding the heat-expandable microspheres as claimed in claim 1.

9. A formed product manufactured by molding or applying a coat of the composition as claimed in claim 8.

10. The heat-expandable microspheres as claimed in claim 1, wherein the amount of the nitrile monomer (A) in the polymerizable component is from 25 to 50 wt %, the amount of the carboxyl-group-containing monomer (B) in the polymerizable component is from 35 to 60 wt %, and the amount of the monomer (C) in the polymerizable component is from 2 to 30 wt %.

11. The heat-expandable microspheres as claimed in claim 1, wherein the amount of the nitrile monomer (A) in the polymerizable component is from 25 to 40 wt %, the amount of the carboxyl-group-containing monomer (B) in the polymerizable component is from 40 to 60 wt %, and the amount of the monomer (C) in the polymerizable component is from 5 to 25 wt %.

12. The heat-expandable microspheres as claimed in claim 3, wherein the amount of the monomer (C4) in the polymerizable component is from 0.01 to 5 wt %, and the amount of the at least one monomer selected from the monomers (C1), (C2) and (C3) is from 0.3 to 44.9 wt %.

13. The heat-expandable microspheres as claimed in claim 1, wherein the polymerizable component comprises a cross-linking agent having 2 or more radically polymerizable double bonds, the amount of the cross-linking agent is from 0.02 to 3.0 parts by weight to 100 parts by weight of the total amount of the nitrile monomer (A), carboxyl-group-containing monomer (B) and monomer (C).

14. The heat-expandable microspheres as claimed in claim 1, wherein an angle of repose ranging from 25 to 35 degrees placed on the plane at 25° C. and 40-% RH, the angle of repose is measured according to JIS R 9301-2-2.

* * * * *